United States Patent [19]
DeNicola, Jr. et al.

[11] Patent Number: 5,817,707
[45] Date of Patent: Oct. 6, 1998

[54] PROCESS FOR MAKING PROPYLENE GRAFT COPOLYMERS USING A REDOX INITIATOR SYSTEM

[75] Inventors: Anthony J. DeNicola, Jr., Newark; Abuzar Syed, Bear, both of Del.

[73] Assignee: Montell North America Inc., Wilmington, Del.

[21] Appl. No.: 643,812

[22] Filed: May 6, 1996

[51] Int. Cl.$^6$ .......................... C08J 3/28; C08F 255/02; C08F 255/04; C08F 255/06

[52] U.S. Cl. .......................... 522/157; 522/158; 522/161; 525/246; 525/259; 525/262

[58] Field of Search ............................. 522/85, 86, 157, 522/161, 158; 525/246, 259, 262

[56] References Cited

U.S. PATENT DOCUMENTS

| | | | |
|---|---|---|---|
| Re. 29,100 | 1/1977 | Patton | 526/22 |
| 3,458,597 | 7/1969 | Jabloner | 260/877 |
| 3,949,018 | 4/1976 | Agouri et al. | 260/878 |
| 4,443,584 | 4/1984 | Michel | 525/286 |
| 5,001,197 | 3/1991 | Hendewerk | 525/285 |
| 5,266,607 | 11/1993 | Lucas et al. | 522/76 |
| 5,411,994 | 5/1995 | Galli et al. | 521/50.5 |

OTHER PUBLICATIONS

Mikulasova et al., "Role of Polypropylene Polyhydroperoxide in the Emulsion Polymerization of Styrene and Methyl Methacrylate", *Chem, Zvesti,* 27,263–267 (1973).

Milulasova et al., "Redox Polymerization Systems for the Preparation of Grafted Polypropylene. I. Grafting of Polypropylene with Styrene in the Presence of Triethylene-tetramine Metal Chelates", *Chem, Zvesti,* 27,263–267 (1973).

Citovicky et al., "Redox Polymerization Systems for the Preparation of Grafted Polypropylene. II. Grafting of Polypropylene with Vinyl or Diene Monomers in the Presence of $Fe^{2+}$ Chelates", *Chem, Zvesti,* 27 , 268–272(1973).

*Primary Examiner*—Susan W. Berman

[57] ABSTRACT

A graft copolymer of a propylene polymer material is prepared by (1) making an oxidized propylene polymer material by (a) irradiating a porous particulate propylene polymer material in the substantial absence of oxygen, (b) exposing the irradiated propylene polymer material to a controlled amount of oxygen of greater than 0.004% but less than 15% by volume at a temperature of 40° C. to 110° C., and (c) heating the irradiated polymer material to a temperature of at least 110° C. in the presence of a controlled amount of oxygen within the same range as is used in the previous step, (2) dispersing the resulting oxidized propylene polymer material in water in the presence of a surfactant at a temperature of 30° C.–90° C., (3) adding (a) a primary reducing agent, (b) a chelating agent, and (c) a secondary reducing agent, (4) adding at least one vinyl monomer, and (5) recovering the graft copolymer from the reaction mixture.

13 Claims, 4 Drawing Sheets

PROCESS FOR MAKING PROPYLENE GRAFT COPOLYMERS USING A REDOX INITIATOR SYSTEM

FIELD OF THE INVENTION

This invention relates to a method for making graft copolymers of a propylene polymer material using a redox initiation system.

BACKGROUND OF THE INVENTION

Graft copolymers of propylene polymer materials have been of interest for some time because they exhibit some properties of the grafted, polymerized monomer(s) as well as of the propylene polymer backbone. Graft copolymers of propylene polymer materials have been made by forming active sites on the propylene polymer backbone by treatment with peroxides or with high energy ionizing radiation, either in the presence of at least one monomer capable of grafting to the active sites, or followed by treatment with at least one such monomer. The free radicals produced in the propylene polymer as a result of the irradiation or peroxide treatment act as initiators for the polymerization of the monomer(s), as well as active sites for grafting.

High temperature grafting of vinyl monomers onto polypropylene using free radical initiators such as peroxides results in only moderate grafting efficiency (25–30%). Higher grafting efficiencies are obtained when free radicals are produced by irradiation rather than with peroxides. However, when conventional low porosity propylene polymer particles are used, grafting takes place primarily on the surface of the particles and therefore distribution of the polymerized grafting monomer is not uniform throughout the polymer particles. "Redox" polymerization initiator systems, which contain both oxidizing and reducing agents, have also been used for producing graft copolymers. Free radicals are generated at considerably lower temperatures than when peroxides are used to generate free radicals. Organic peroxides are typically used as the oxidizing agent and ferrous ion as the reducing agent. Colloidal dispersions can be used, from which sufficient ferrous ions are released throughout the polymerization to react with the hydroperoxide and peroxide groups that are formed on the polymer. Secondary reducing agents such as sugars and sodium formaldehyde sulfoxylate are often used to ensure the presence of the ferrous ions for improved efficiency of initiation and constant rate of polymerization throughout the course of the reaction.

Application of redox systems to emulsion polymerization has brought about significant improvement in several commercial processes such as in styrene/butadiene rubber latex manufacture. The use of redox systems is also applicable to heterogeneous systems where oxidizing and reducing agents are immiscible. Emulsion polymerization is generally used in such cases. For example, polypropylene can be grafted with water-insoluble monomers using water-insoluble polypropylene peroxides as the oxidizing agent in an aqueous emulsion in the presence of ferrous salts as the reducing agent and a surfactant. The decomposition of such polypropylene peroxides generates polypropylene oxide radicals that are capable of initiating the polymerization of various monomers even at low temperatures.

The effect of various metal ions in the presence of the chelating agent triethylenetetramine (TETA) in the grafting of oxidized isotactic polypropylene with styrene in emulsion was evaluated at 35° C. by Mikulasova et al., Chem. Zvesti, 27, 263–267 (1973). The ability of iron (II) sulfate to activate grafting of vinyl and diene monomers onto polypropylene in the presence of various chelating agents was investigated by Citovicky et al., Chem. Zvesti, 27, 268–272 (1973). In both these systems a nonporous, powdered isotactic polypropylene was oxidized by oxygen with an ozone concentration of 12 mg/l at room temperature (~25° C.).

A process for hydroperoxidizing a polymer by contacting an aqueous suspension of a polymer having hydrogen attached to tertiary carbon atoms in the polymer chain, with molecular oxygen in the presence of a cationic surface active agent is disclosed in USP 3,458,597. Graft copolymers can be prepared by contacting the hydroperoxidized polymer with a vinylidene monomer in the presence of a redox reducing agent at 90° C.

SUMMARY OF THE INVENTION

The process of this invention for making a graft copolymer of a propylene polymer material comprises (1) making an oxidized propylene polymer material by (a) irradiating a particulate polypropylene material having (i) a pore volume fraction of at least 0.07 wherein more than 40% of the pores have a diameter larger than 1 micron, (ii) a surface area of at least 0.1 m$^2$/g, and (iii) a weight average diameter of about 0.4 to about 7 mm, in an environment in which the concentration of active oxygen is equal to or less than 0.004% by volume, (b) exposing the irradiated propylene polymer material to a controlled amount of oxygen of greater than 0.004% and less than 15% by volume at a temperature of about 40° C. to about 110° C., and (c) heating the irradiated polymer to a temperature of at least 110° C. in the presence of a controlled amount of oxygen within the same range as is used in (b), (2) dispersing the resulting oxidized propylene polymer material in water in the presence of a surfactant at a temperature of about 30° C. to about 90° C., (3) adding (a) a primary reducing agent, (b) a chelating agent, and (c) a secondary reducing agent, (4) adding at least one vinyl monomer, and (5) recovering the graft copolymer from the reaction mixture.

The reaction temperature and the porous nature of the polymeric starting material used in the process of this invention shorten the reaction time of the graft polymerization, improve the conversion of grafting monomer to polymer (both grafted and ungrafted polymer), improve grafting efficiency, give better control of the weight average molecular weight $M_w$ of the ungrafted polymer present in the particles, and provide more uniform distribution of the polymerized grafting monomer in the matrix of propylene polymer material.

BRIEF DESCRIPTION OF THE DRAWINGS

FIG. 1 47X phase-contrasted microtomed photomicrograph of a cross-section of a high porosity particle of polypropylene grafted with styrene in which the polymerized styrene is uniformly dispersed within the particle. The area and direction of the mapping path are shown.

DETAILED DESCRIPTION OF THE INVENTION

The propylene polymer material used as the starting material in the process of this invention is (a) a homopolymer of propylene, (b) a random copolymer of propylene with ethylene or a linear or branched 4–10 carbon alpha-olefin, provided that when the comonomer is ethylene the maximum polymerized ethylene content is 10%, preferably about 4%, and when the comonomer is a 4–10 carbon alpha-olefin, the maximum polymerized content thereof is 20%, preferably about 16%, or (c) a terpolymer of propylene and two different alpha-olefins selected from the group consisting of ethylene and 4–8 carbon alpha-olefins, provided that when ethylene is one of the different alpha-olefins, the maximum polymerized ethylene content is 5%, preferably about 4%, and when the different alpha-olefin is a 4–8 carbon alpha-olefin, the maximum polymerized content of the 4–8 carbon alpha-olefin is 20%, preferably about 16%.

The 4–10 carbon alpha-olefins that can be used when the propylene polymer material is a random copolymer or terpolymer of propylene include, for example, 1-butene, isobutylene, 3-methyl-i-butene, 3,4-dimethyl-i-butene, 1-pentene, 4-methyl-i-pentene, 1-hexene, 3-methyl-i-hexene, 1-heptene, 1-octene, and 1-decene.

The propylene polymer material has (a) a pore volume fraction of at least 0.07 wherein more than 40% of the pores have a diameter larger than 1 micron, (b) a surface area of at least 0.1 $m^2/g$, and (c) a weight average diameter of about 0.4 to about 7 mm. The use of porous polymer particles as opposed to conventional small pore diameter, low porosity, or nonporous particles of propylene polymer material improves the uniformity of the distribution of polymerized monomer within the matrix of propylene polymer material, improves the grafting efficiency, and improves control of the $M_w$ of the ungrafted polymer. Low porosity and nonporous polymer materials have a tendency to oxidize only at the surface of the particles and therefore do not have a uniform distribution of polymerized monomer throughout the particle; rather they form shell/core type particles with the propylene polymer forming the core and the grafted polymer the shell.

The propylene polymer starting material is exposed to high energy ionizing radiation in an essentially oxygen-free environment, i.e., an environment in which the active oxygen concentration is established and maintained at 0.004% by volume or less. The ionizing radiation should have sufficient energy to penetrate to the extent desired the mass of propylene polymer material being irradiated. The ionizing radiation can be of any kind, but the most practical kinds are electrons and gamma rays. Preferred are electrons beamed from an electron generator having an accelerating potential of 500–4,000 kilovolts. Satisfactory results are obtained at a dose of ionizing radiation of about 0.5 to about 15 megarads, preferably about 0.5 to about 10 megarads.

The term "rad" is usually defined as that quantity of ionizing radiation that results in the absorption of 100 ergs of energy per gram of irradiated material. Energy absorption from ionizing radiation is measured by the well known conventional dosimeter, a measuring device in which a strip of polymer film containing a radiation-sensitive dye is the energy absorption sensing means. Therefore, as used in this specification, the term "rad" means that quantity of ionizing radiation resulting in the absorption of the equivalent of 100 ergs of energy per gram of the polymer film of a dosimeter placed at the surface of the propylene polymer material being irradiated, whether in the form of a bed or layer of particles, or a film, or a sheet.

The free radical-containing irradiated propylene polymer material is then subjected to a series of oxidative treatment steps. The preferred way of carrying out the treatment is to pass the irradiated polymer through a first fluid bed assembly operating at $T_1$ in the presence of a controlled amount of oxygen, and then through a second fluid bed assembly operating at $T_2$ in the presence of a controlled amount of oxygen within the same range as in the first step. In commercial operation a continuous process using separate fluid beds is preferred. However, the process can also be carried out in a batch mode in one fluid bed, using a fluidizing gas stream heated to the desired temperature for each treatment step. Unlike some techniques, such as melt extrusion methods, the fluidized bed method does not require the conversion of the irradiated polymer into the molten state and subsequent resolidification and comminution into the desired form.

The first treatment step consists of heating the polymer in the presence of a controlled amount of active oxygen in the range of greater than 0.004% but less than 15% by volume, preferably less than 8%, and most preferably less than 3%, to a temperature of about 40° C. to about 110° C., preferably about 80° C. Heating to the desired temperature is accomplished as quickly as possible, preferably in less than 10 minutes. The polymer is then held at the selected temperature, typically for about 90 minutes, to increase the reaction rate of the oxygen with the free radicals in the polymer. The holding time, which can easily be determined by one skilled in the art, depends upon the properties of the starting material, the oxygen concentration used, the irradiation dose, and the temperature. The maximum time is determined by the physical constraints of the fluid bed.

In the second treatment step, the polymer is heated in the presence of a controlled amount of oxygen in the same range as used in the first treatment step to a temperature of at least 110° C. up to the softening point of the polymer (140° C. for a propylene homopolymer). The polymer is then held at the selected temperature, typically for about 90 minutes, to increase the rate of chain scission. The holding time is determined by the same factors discussed in relation to the first treatment step. The polymer is then cooled to a temperature of about 70° C. over a period of about 10 minutes in an essentially oxygen-free atmosphere, i.e., 0.004% by volume or less, before being discharged from the bed. In this manner stable intermediates are formed that can be stored at room temperature for long periods of time without further degradation.

The expression "active oxygen" means oxygen in a form that will react with the irradiated propylene polymer material. It includes molecular oxygen, which is the form of oxygen normally found in air. The active oxygen content requirement of the process of this invention can be achieved by use of a vacuum or by replacing part or all of the air in the environment by an inert gas such as, for example, nitrogen or argon.

The concentration of peroxide groups formed on the polymer can be controlled easily by varying the radiation dose and the amount of oxygen to which the polymer is exposed after irradiation. The oxygen level in the fluid bed gas stream is controlled by the addition of air at the inlet to the fluid bed. Air must be constantly added to compensate for the oxygen consumed by the formation of peroxides in the polymer. The fluidizing medium can be, for example, nitrogen or any other gas that is inert with respect to the free radicals present, e.g., argon, krypton, and helium.

The oxidized propylene polymer material is then dispersed in water in the presence of a surfactant at a temperature of about 30° C. to about 90° C., preferably about 65° C. to about 80° C. The surfactants used in the process of this invention can be anionic, cationic, or nonionic surfactants, depending upon the miscibility with water of the monomer (s) used for grafting. For example, sodium myristate, an anionic surfactant, is preferred for styrene polymerization, and a polyoxyethylene ether of a long chain alkanol, a nonionic surfactant, is preferred for methyl methacrylate. Forming a slurry of oxidized propylene polymer material prior to the addition of reducing agents produces better diffusion of the reducing agents into the matrix in order to react with the peroxy groups on the polymer and to generate free radicals. The surfactant also forms an emulsion with water-immiscible monomer and forms stable micelles, as well as improving the solubility of monomer in the aqueous phase. About 0.1 to about 1.0% of the surfactant, based on the amount of water, is typically used.

Suitable anionic surfactants include, for example, (a) alkali metal salts of organic carboxylic acids having the general formula $RCOO-M^x$, where R is a long chain hydrocarbon group ($C_9-C_{22}$) and M is a metal or ammonium ion; (b) alkali metal salts of sulfonates of the general formula $R-SO_3^{31} M^+$, where R is a linear or branched alkyl, aryl or alkylaryl group and M is a metal ion, and (c) alkali metal salts of sulfates of long chain fatty acids having the formula $RSO_4^{31} M^{++}$, where R is a 9–22 carbon linear or branched alkyl group and M is a metal ion.

Suitable cationic surfactants include, for example, primary, secondary and tertiary monoamines or diarines and their quaternary ammonium salts $R-N^+R'R''R'''$, and salts of long chain substituted cyclic amines having the formula R- such as pyridine, morpholine, and piperidine, where R is a 1–18 carbon linear or branched alkyl or alkenyl group and R', R'', and R''' are H or R. Other examples of cationic sufactants include cetyltrimethylammonium chloride, distearyl dimethylammonium chloride, n-hexadecyltrimethylammonium bromide, and n-decyltrimethylammonium bromide.

Suitable nonionic surfactants include, for example, esters of polyalcohols and long chain fatty acids having the formula $RCOO-[CH_2CH_2O]_n-H$, where n is 4–20 and R is a 9–21 carbon linear or branched alkyl group; polyoxyethylene ethers of long chain alkanols having the formula $RO-[-CH_2CH_2O-]_n-H$ where R is a 9–21 carbon linear or branched alkyl group and n is 4–23, and homologs of ethoxylated alkylphenols of the general formula $R-Ar-O-[CH_2CH_2O]_{n-1}-CH_2CH_2OH$, where R is a linear or branched alkyl group, Ar is an aryl group, and n is 2–40.

The following components are then added to the aqueous emulsion of oxidized polymer: (1) a primary reducing agent, (2) a chelating agent, and (c) a secondary reducing agent.

Reducing agents suitable for use in the process of this invention include transition metal salts of inorganic acids, e.g., sulfates and nitrates. Metals having more than one oxidation state, selected from Groups IB (e.g., Cu, Ag), IIEB ( e.g., Ce), IVB (e.g., Ti), VB (e.g., V), VIB (e.g., Cr, Mo), VIIB (Mn), and VIIIB (Fe, Co, Ni) of the Periodic Table, are normally used. Ferrous sulfate is preferred. The reducing agent is preferably used at a molar ratio of oxygen in the oxidized polymer to reducing agent of approximately 1:1.

Chelating agents suitable for use in the process of this invention contain two or more electron donor atoms that can form coordinate bonds to a single transition metal atom creating a ring structure containing a metal ion. Examples include ethylenediaminetetraacetic acid, hydroxyethylethylenediaminetriacetic acid, nitrilotriacetic acid, citric acid, tartaric acid, gluconic acid, 5-sulfosalicylic acid, ethylenediamine, diethylenetriamine, triethylenetetramine, triaminotriethylamine, triethanolamine, N-hydroxyethylethylenediamine and sodium oxalate. Triethylenetetramine is preferred.

The concentrations of the reducing and chelating agents depend upon the concentration of oxygen in the oxidized propylene polymer material and typically are in the range of 0.05–1 equivalent of reducing agent or chelating agent per equivalent of oxygen in the oxidized polymer. The molar ratio of chelating agent to reducing agent is typically in the range of 2:3 to 1:1.

Secondary reducing agents are used to ensure a constant concentration of reducing metal ions throughout the period of polymerization, thus ensuring efficient initiation of polymerization and a constant polymerization rate. Suitable examples of secondary reducing agents include sugars such as fructose and glucose, dihydroxyacetone and sodium formaldehyde sulfoxylate (SFS).

Monomers suitable for grafting onto the backbone of propylene polymer material can be any monomeric vinyl compound wherein the vinyl radical, $CH_2=CR-$, in which R is H or methyl, is attached to a straight or branched aliphatic chain or to a substituted or unsubstituted aromatic, heterocyclic, or alicyclic ring in a mono-or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, methylstyrenes, methyichlorostyrene, p-tert-butylstyrene, methylvinylpyridine, and ethylvinylpyridine, and (2) (meth) acrylic nitriles and (meth)acrylic acid esters such as acrylonitrile, methacrylonitrile, acrylate esters, such as the methyl, ethyl, hydroxyethyl, 2-ethylhexyl, and butyl acrylate esters, and methacrylate esters, such as the methyl, ethyl, butyl, benzyl, phenylethyl, phenoxyethyl, epoxypropyl, and hydroxypropyl methacylate esters. Of the various vinyl monomers that can be used, styrene, acrylonitrile, butyl acrylate, 2-ethylhexyl acrylate, methyl acrylate, methyl methacrylate, butyl methacrylate, and mixtures thereof are preferred.

The grafting monomer is added to the emulsion after the reagents added previously have had time to diffuse into the porous propylene polymer material, typically after 10–12 minutes. A maximum of 120 parts grafting monomer per hundred parts of oxidized polymer is preferred.

During the graft polymerization, the monomer(s) also polymerize or copolymerize to form a certain amount of free or ungrafted polymer or copolymer. The morphology of the grafted polymer is such that the propylene polymer material is the continuous or matrix phase, and the polymerized monomer(s), both grafted and ungrafted, are a dispersed phase. A grafting efficiency of greater than 60% is preferred.

At the completion of the graft polymerization reaction the graft copolymer is recovered from the reaction mixture, for example by washing with excess water and then methanol-HCI, and dried.

Figure 1:
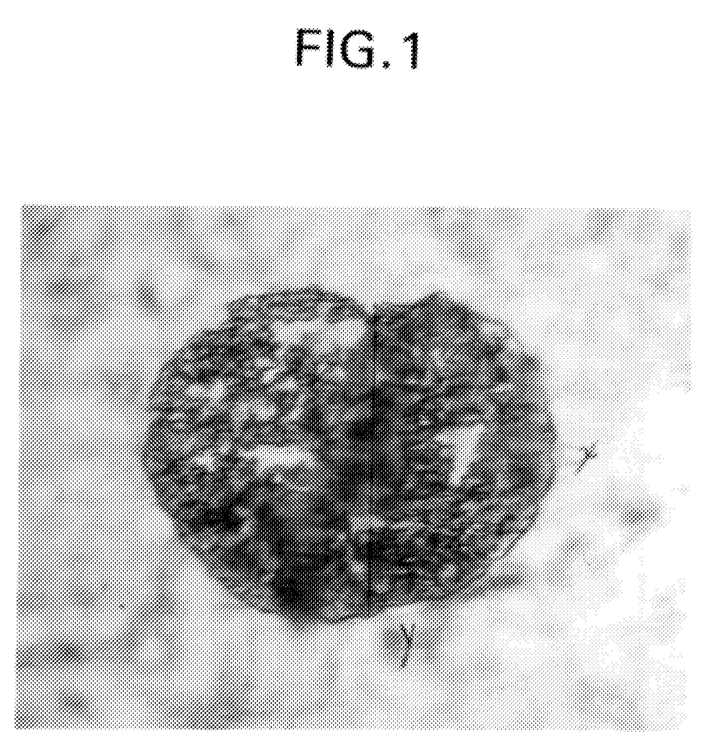
Figure 2:
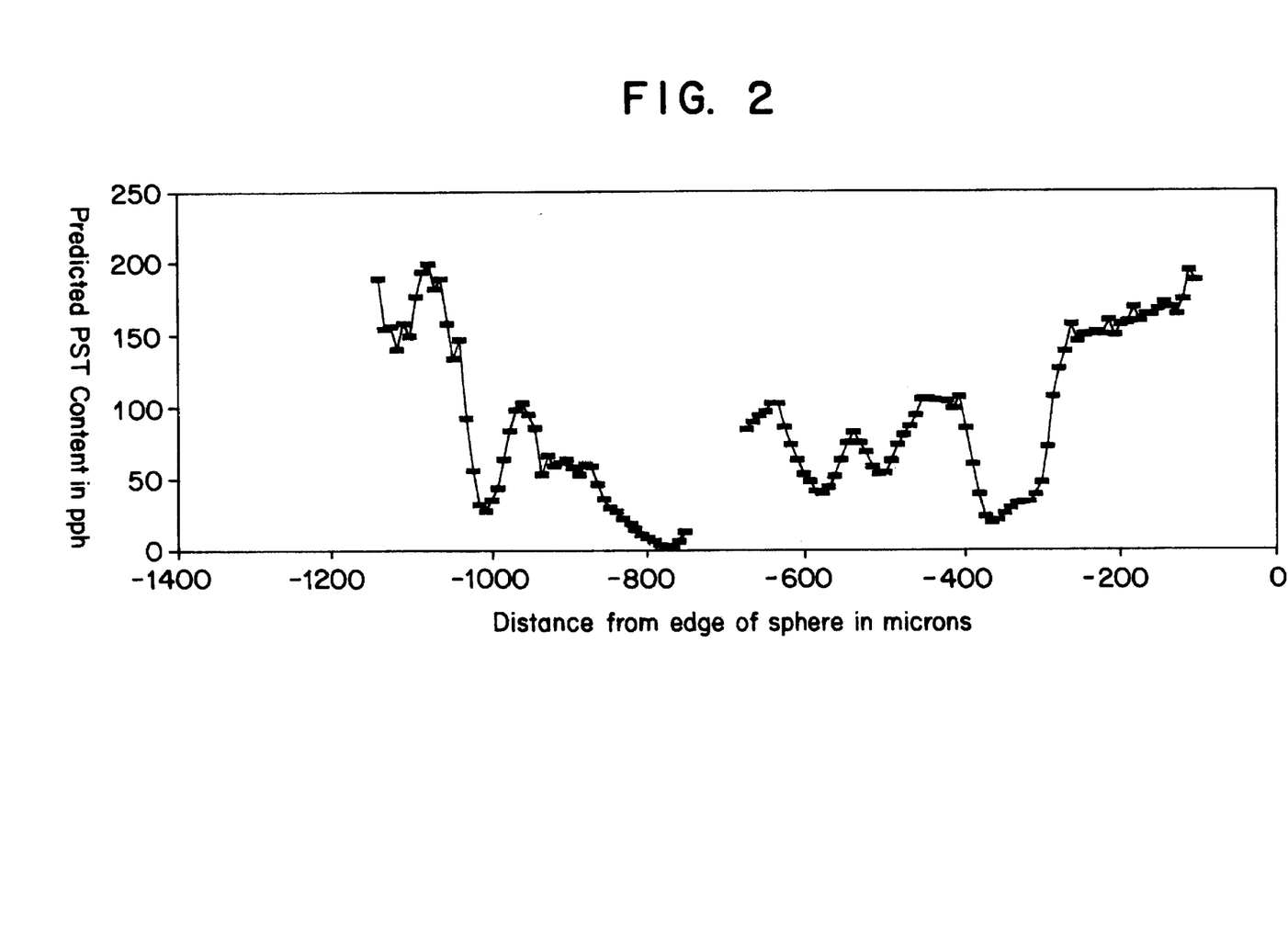
FIG. 2 is a plot of the polystyrene content at a specific point against the corresponding distance in microns from the edge of the particle shown in FIG. 1. The data were collected by infrared spectroscopy.
Figure 3:
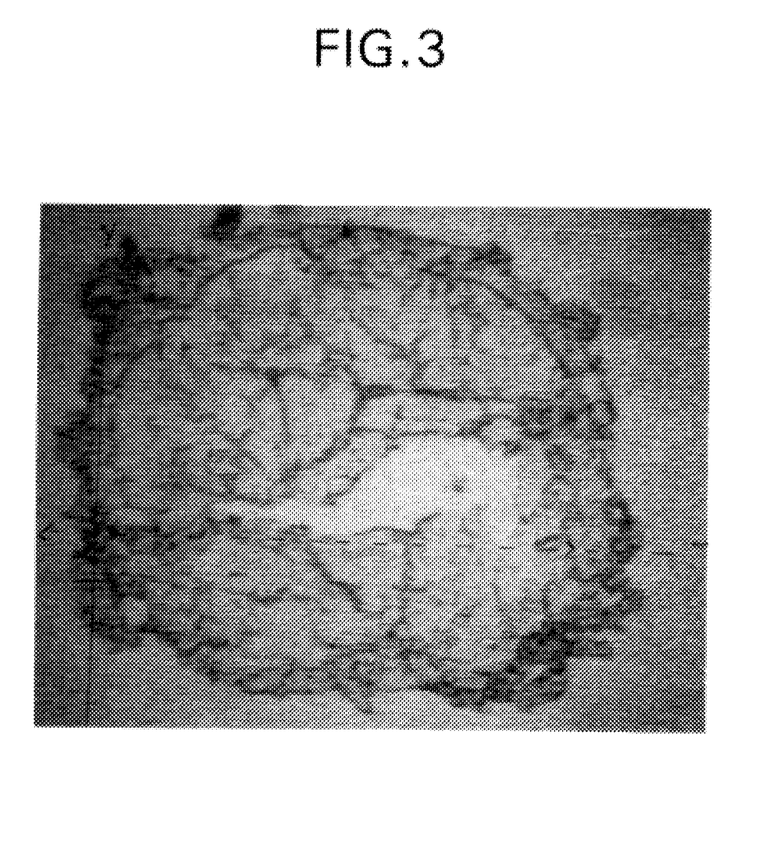
FIG. 3 is a 50X phase-contrasted microtomed photomicrograph of a cross-section of a low porosity particle of polypropylene grafted with styrene in which the polymerized styrene is concentrated around the surface of the particle.
Figure 4:
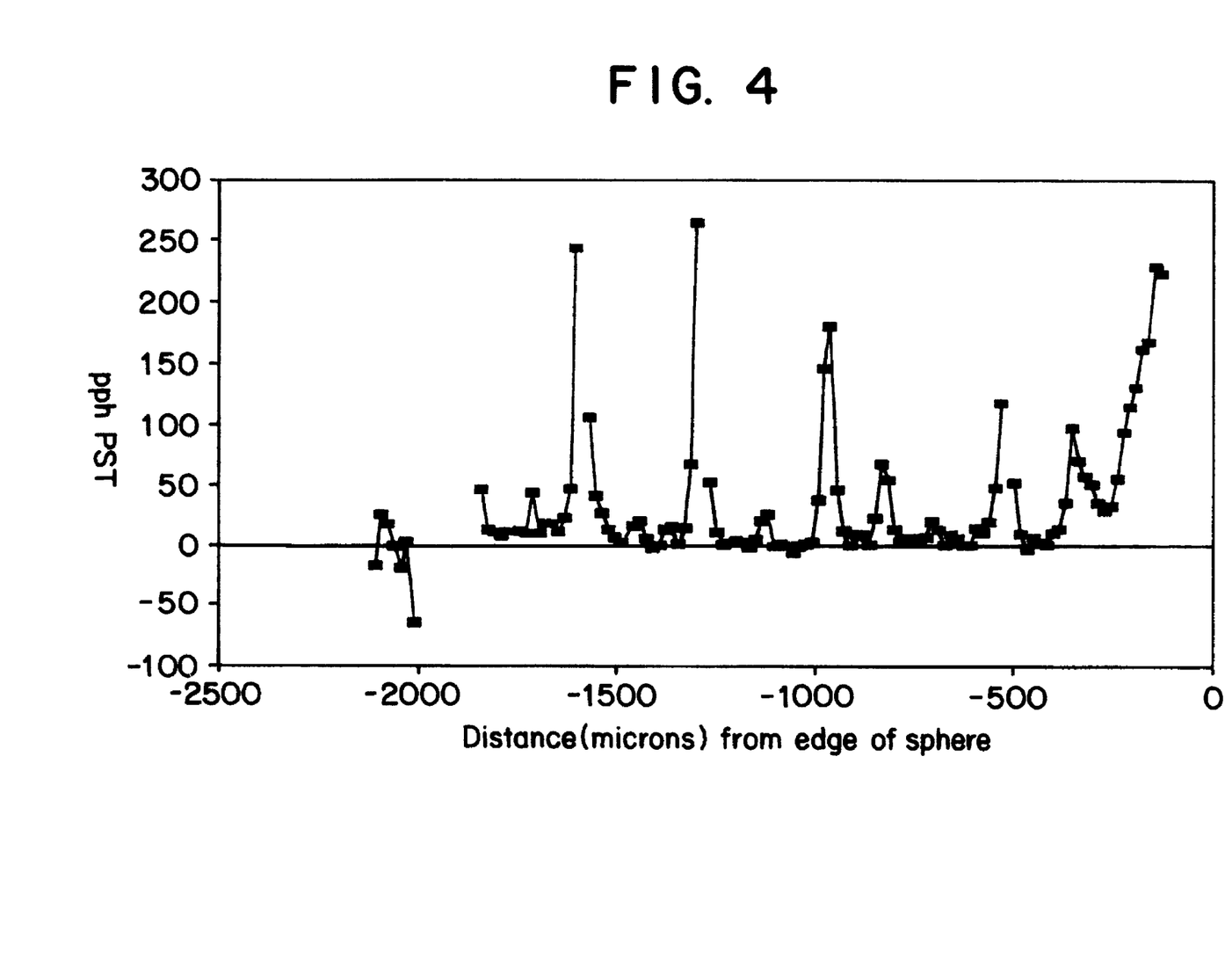
FIG. 4 is a plot of the polystyrene content at a specific point against the corresponding distance in microns from the edge of the particle shown in FIG. 3. The data were collected by infrared spectroscopy. The area and direction of the mapping path are shown.

The microstructural differences between a grafted propylene homopolymer material of this invention and a grafted propylene homopolymer material made by graft polymerizing onto a conventional small pore diameter, low porosity propylene homopolymer particle can be seen by reference to FIGS. 1–4. In FIG. 1, which shows a grafted propylene homopolymer particle of the invention, i.e., a particles of the product described in Example 7, regions of high polystyrene concentration, i.e., polystyrene grafted to the propylene homopolymer, are seen not only at the surface of the particle but throughout and deep within the interior of the particle. The presence of the polystyrene in these regions was confirmed by means of a Fourier transform infrared scanning microscope, as shown in FIG. 2. In a particle of the product prepared from a commercially available low porosity polypropylene shown in FIG. 3, the high polystyrene level is essentially confined to regions around the outer surface of the particle. The styrene content in the interior of this particle, if any, is extremely low, indicating an essentially ungrafted propylene homopolymer core. This was confirmed by IR scanning microscopy as shown in FIG. 4, i.e., the scanning microscope did not show any polystyrene content in the interior of this particle.

In the following examples, the melt flow rate (MFR) of the oxidized polypropylene was determined by ASTM D-1238, Condition L (230° C., 2.16 kg) and the MFR of the product was determined by ASTM D-1238, at 230° C. using a weight of 3.8 kg. Grafting efficiency is defined as the weight % grafted polymer actually grafted onto the propylene polymer material. It is calculated from the xylene solubles measurement. % Xylene solubles at 25° C. was determined by dissolving 2 g of polymer in 200 ml of xylene at 135° C., cooling in a constant temperature bath to 25° C., and filtering through fast filter paper. An aliquot of the filtrate was evaporated to dryness, the residue was weighed and the weight % soluble fraction was calculated. Molecular weights of the soluble fraction were determined by gel permeation chromatography using a Perkin Elmer isocratic LC pump 250 and a refractive index detector or UV detector at 260 nm.

Unless otherwise noted, all parts and percentages in this specification are by weight.

EXAMPLE 1

This example illustrates how styrene polymerization during the preparation of polypropylene grafted with styrene is affected by the grafting reaction temperature.

A propylene homopolymer was irradiated by the process described above at a radiation dose of 2 Mrad. The irradiated polymer was exposed to 1000 ppm (0. 1% by volume) of active oxygen in the first and second treatment steps. The oxidized polymer therefore had an oxygen concentration of 1000 ppm. In the first treatment step, the polymer was heated to 80° C. and held at that temperature for 90 minutes. In the second treatment step, the polymer was heated to 1 40° C. and held at that temperature for 60 minutes. The propylene homopolymer had a surface area of 0.3 m²/g, a weight average diameter of 1.9 mm, a pore volume fraction of 0.31 wherein more than 90% of the pores had a diameter larger than 1 micron, a porosity of 0.47 cc/g, a MFR of 23 dg/min and a $M_w$ of 230,000, and is available from Montell USA Inc.

Reaction Temperature of 35° C.

A stirred suspension of oxidized polypropylene (100 g, 3.12 mmol) and sodium myristate (0.68 g, 0.15%) in deionized water (460 ml) (water/monomer =5.5) was purged with nitrogen and heated to 35° C. After 20 minutes at 35° C., $FeSO_4$ (0.8 g, 2.88 mmol), triethylenetetramine (TETA) (0.64 g, 4.4 mmol) and glucose (1.0 g, 5.56 mmol) were added. After 15 minutes, styrene (85 g, 85 parts styrene per hundred parts of oxidized polymer (pph)) was added slowly. The reaction mixture was stirred with a mechanical stirrer for six hours at 35° C. and was left at room temperature for 15 hours (overnight). The suspended polymer was filtered on a Buchner funnel and washed with excess water and methanol (200 ml). The product was soaked in methanol (500 ml) for several hours and filtered again. The polymer was then dried in a vacuum oven at 80° C.–100° C.

Reaction Temperature of 50° C.

A stirred suspension of oxidized polypropylene (50 g, 1.56 mmol) and sodium myristate ( 0.34 g, 0.15%) in deionized water (230 ml) was purged with nitrogen and heated to 50° C. At 50° C., $FeSO_4$ (0.4 g, 1.44 mmol), TETA (0.32 g, 2.2 mmol) and glucose (0.5 g, 2.78 mmol) were added. After 15 minutes, styrene (42.5 g, 85 pph) was added slowly. The reaction mixture was stirred for three hours at 50° C. The product was isolated as described above.

Reaction Temperature of 60° C.

A stirred suspension of oxidized polypropylene and sodium myristate in deionized water in the amounts given above was purged with nitrogen and heated to 60° C. At 50° C., $FeSO_4$, TETA and glucose in the amounts given above were added. The reaction mixture was stirred with a mechanical stirrer for three hours at 60° C. The product was isolated as described above.

Reaction Temperature of 700° C.

A stirred suspension of oxidized polypropylene and sodium myristate in deionized water in the amounts given above was purged with nitrogen and heated to 70° C. At 60° C., $FeSO_4$, TETA and glucose in the amounts given above were added in the order given. After 15 minutes, styrene in the amount given above was added slowly at 70° C. The reaction mixture was stirred with a mechanical stirrer for three hours at 70° C. The product was isolated as described above.

Reaction Temperature of 80° C.

A stirred suspension of oxidized polypropylene and sodium myristate in deionized water in the amounts given above was purged with nitrogen and heated to 80° C. At 70° C., $FeSO_4$, TETA and glucose in the amounts given above were added in the order given. After 10 minutes, styrene in the amount given above was added slowly at 80° C. The polymer was free flowing in 30 minutes, indicating completion of the reaction. After stirring for an additional two hours at 80° C., the product was isolated as described above.

For each reaction temperature, the % conversion of styrene monomer to polystyrene (both grafted and ungrafted), the MFR of the product, the $M_w$ and $M_w/M_n$ of the ungrafted polystyrene, and the grafting efficiency are given in Table 1.

TABLE 1

| | | | | | |
|---|---|---|---|---|---|
| Oxidized PP, MFR | 770 | 770 | 770 | 770 | 770 |
| Radiation dose (Mrad) | 2 | 2 | 2 | 2 | 2 |
| $O_2$ concentration (ppm) | 1000 | 1000 | 1000 | 1000 | 1000 |
| Reaction temperature (°C.) | 35 | 50 | 60 | 70 | 80 |
| Add level (pph) | 85 | 85 | 85 | 85 | 85 |
| Converaion (%) | 80 | 88 | 88 | 92 | 92 |
| MFR | 54.9 | 35.3 | 45.5 | 40.4 | 36.6 |
| Mw x 1000 | 3110 | 2590 | 1790 | 1480 | 880 |
| Mw/Mn | 3 | 3.3 | 3.9 | 5.5 | 4.6 |
| GE (%) | 18.2 | 32 | 41.8 | 71.3 | 79.9 |

EXAMPLE 2

This example illustrates how styrene polymerization during the preparation of polypropylene grafted with styrene is affected by the radiation dose absorbed during irradiation of the propylene homopolymer.

The propylene homopolymer (PP) described in Example 1 was irradiated as described in Example 1 using absorbed radiation doses of 0.5, 2 and 6 Mrad. In each case the polymer was exposed to an oxygen concentration of 1000 ppm (0.1% by volume).

A stirred suspension of each of the samples of oxidized polypropylene (50 g) and 10 sodium myristate (0.34 g, 0.15%) in deionized water (230 ml) was purged with nitrogen and heated to 50° C. At 50° C., $FeSO_4$ (0.4 g, 1.44 mmol), TETA (0.32 g, 2.2 mmol) and glucose (0.5 g, 2.78 mmol) were added to the suspension. After 10 minutes, styrene (42.5 g, 85 pph) (water/monomer =5.5) was added slowly. The reaction mixture was stirred with a mechanical stirrer for three hours at 50° C. The product was isolated as described in Example 1. The % conversion of styrene monomer to polystryene (both grafted and ungrafted), the MFR of the product, the weight average molecular weight $M_w$ and molecular weight distribution ($M_w/M_n$) of the ungrafted polystyrene, and the grafting efficiency (GE) for each radiation dose are given in Table 2.

TABLE 2

| Oxidized PP, MFR | 602 | 770 | 1097 |
|---|---|---|---|
| Radiation dose (Mrad) | 0.5 | 2 | 6 |
| $O_2$ concentration (ppm) | 1000 | 1000 | 1000 |
| Add level (pph) | 85 | 85 | 85 |
| Reaction temperature (°C.) | 50 | 50 | 50 |
| Conversion (%) | 85 | 88 | 85 |
| MFR | >200 | 35.3 | 47.75 |
| Mw × 1000 | 1680 | 2590 | 2240 |
| Mw/Mn | 5.1 | 3.3 | 3.2 |
| GE (%) | 29.4 | 32 | 38 |

The data show that grafting efficiency increased with increasing radiation dose.

EXAMPLE 3

This example illustrates how styrene polymerization during the preparation of polypropylene grafted with styrene is affected by the concentration of oxygen to which the propylene homopolymer was exposed after irradiation.

Samples of oxidized polypropylene were prepared by exposing propylene homopolymer to 1000, 3000 and 20,000 ppm oxygen (0.1, 0.3 and 2.0 % by volume) after the irradation process described in Example 1. The propylene homopolymer used for the first two experiments was the same as the one used in Example 1. The propylene homopolymer exposed to 20,000 ppm oxygen was nonporous (porosity 0.15 cc/g), had a MFR of 0.8 dg/min and $M_w$ of 800,000, and is available from Montell USA Inc.

Each of the oxidized polypropylene samples (100 g) was suspended in deionized water (460 ml) containing 0.68 g (0.15%) of sodium myristate and the suspension was purged with nitrogen and heated to 35° C. After 20 minutes at 35° C., $FeSO_4$ (0.8 g, 2.88 mmol), TETA( 0.64 g, 4.4 mmol) and glucose (1.0 g, 5.56 mmol) were added. After 15 minutes, styrene (85 g, 85 pph) was added slowly. The reaction mixture was stirred with a mechanical stirrer for six hours at 35° C. and was left at room temperature for 15 hours (overnight). The product was isolated as described in Example 1.

The % conversion of styrene monomer to polystyrene (both grafted and ungrafted), the MFR of the product, the $M_w$ and $M_w/M_n$ of the ungrafted polystyrene, and the grafting efficiency are given in Table 3.

TABLE 3

| Oxidized PP, MFR | 602 | 1669 | very high |
|---|---|---|---|
| Radiation dose (Mrad) | 0.5 | 0.5 | 10 |
| $O_2$ concentration (ppm) | 1000 | 3000 | 20,000 |
| Reaction temperature (°C.) | 35 | 35 | 35 |
| Add level (pph) | 85 | 85 | 85 |
| Conversion (%) | 82 | 77 | 90 |
| MFR | 117.2 | 144.7 | >200 |
| Mw × 1000 | 3000 | 2200 | 1320 |
| Mw/Mn | 3.8 | 2.9 | 13 |
| GE (%) | 16 | 23.4 | 37.5 |

The % conversion and the grafting efficiency increased and the $M_w$ of the ungrafted polystyrene decreased with an increase in the oxygen concentration to which the polymer was exposed after irradiation.

EXAMPLE 4

This example describes how styrene polymerization during the preparation of polypropylene grafted with styrene is affected by the use of various reducing agents.

All reactions were carried out as described under "Reaction Temperature of 80° C." in Example 1 using oxidized polypropylene (6 Mrad, 1000 ppm $O_2$), sodium myristate as the surfactant, TETA as the chelating agent, and glucose as the secondary reducing agent.

The % conversion of styrene monomer to polystyrene (both grafted and ungrafted), the MFR of the product, the $M_w$ and $M_w/M_n$ of the ungrafted polystyrene, and the grafting efficiency are given in Table 4.

TABLE 4

| Oxidized PP, MFR | 1097 | 1097 | 1097 | 1097 | 1,097 | 1,097 |
|---|---|---|---|---|---|---|
| Radiation dose (Mrad) | 6 | 6 | 6 | 6 | 6 | 6 |
| $O_2$ concentration (ppm) | 1000 | 1000 | 1000 | 1000 | 1000 | 1,000 |
| Reducing agent | $FeSO_4$ | $MnSO_4$ | $NiSO_4$ | $AgNO_3$ | $CuSO_4$ | $CoSO_4$ |
| Reaction temperature (°C.) | 80 | 80 | 80 | 80 | 80 | 80 |
| Add level (pph) | 85 | 85 | 85 | 85 | 85 | 85 |
| Conversion (%) | 96 | 39 | 90 | 93 | 77 | 98.8 |
| MFR | 9.5 | >300 | 117.1 | 61.4 | 133.4 | >300 |
| Mw × 1000 | 1050 | 1564 | 1622 | 1630 | 841 | 597 |
| Mw/Mn | 4.7 | 3.7 | 3.7 | 4.2 | 5.6 | 5.8 |
| GE (%) | 91.3 | 37.2 | 23.2 | 44.3 | 75.5 | 32.2 |

Ferrous sulfate provided high values for both % conversion and grafting efficiency.

EXAMPLE 5

This examples describes how the molar ratio of oxygen in the oxidized polymer to reducing agent affects styrene polymerization during the preparation of polypropylene grafted with styrene.

All reactions were carried out as described in Example 1 using oxidized polypropylene (2 Mrad, 1000 ppm $O_2$, MFR 770) (300 g, 9.4 mmol $O_2$) and sodium myristate (0.15%) as the surfactant. $FeSO_4$ (2.43 g, 8.7 mmol), TETA (1.89 g, 13 mmol) and glucose (3.0 g, 16.7 mmol) were added at 55° C. and styrene (255 g, 85 pph) was added at 65° C. after 10 minutes. The ratio of oxygen in the oxidized polymer to reducing agent was approximately 1:1. The product was isolated as described in Example 1.

The same experiment was repeated except that 0.59 g $FeSO_4$ (2.12 mmol), 0.47 g TETA (3.2 mmol) and 0.76 g glucose (4.22 mmol) were added. The ratio of oxygen in the oxidized polymer to reducing agent was approximately 4:1.

The % conversion of styrene monomer to polystyrene (both grafted and ungrafted), the MFR of the product, the $M_w$ and $M_w/M_n$ of the ungrafted polystyrene, and the grafting efficiency are given in Table 5.

TABLE 5

| Oxidized PP, MFR | 770 | 770 |
|---|---|---|
| Radiation dose (Mrad) | 2 | 2 |
| $O_2$ concentration (ppm) | 1000 | 1000 |
| $O_2/FeSO_4$ (molar ratio) | >1:1 | >4:1 |
| Reaction temperature (°C.) | 65 | 65 |
| Add level (pph) | 85 | 85 |
| Conversion (%) | 97 | 89 |
| MFR | 14.8 | 19.7 |
| Mw × 1000 | 1260 | 1810 |
| Mw/Mn | 5.9 | 4.8 |
| GE (%) | 84.8 | 60.5 |

The % conversion and grafting efficiency decreased and the $M_w$ of the ungrafted polystyrene increased when the molar ratio of the oxygen concentration in the oxidized polymer to the reducing agent was increased from 1:1 to 4:1.

EXAMPLE 6

This example describes how styrene polymerization during the preparation of polypropylene grafted with styrene is affected by the use of various chelating agents.

All reactions were carried out as described above under "Reaction Temperature of 80° C." in Example 1 using oxidized polypropylene (6 Mrad, 1000 ppm $O_2$), sodium myristate as the surfactant, $FeSO_4$ as the primary reducing agent, and glucose as the secondary reducing agent.

The % conversion of styrene monomer to polystyrene (both grafted and ungrafted), the MFR of the product, the Mw and M of the ungrafted polystyrene, and the grafting efficiency are given in Table 6.

In the table, TETA is triethylenetetramine, ED is ethylenediamine, EDTA Na4 is ethylenediaminetetraacetic acid tetrasodium salt, NTA Na3 is nitrilotriacetic acid trisodium salt, and EDTA is ethylenediaminetetraacetic acid. The ratio of reducing agent to chelating agent was 1.4/4.3 for ED. In all other cases the ratio was 1:1.

TABLE 6

| Oxidized PP, MFR | 1097 | 1097 | 1097 | 1097 | 1097 | 1097 |
|---|---|---|---|---|---|---|
| Radiation dose (Mrad) | 6 | 6 | 6 | 6 | 6 | 6 |
| $O_2$ concentration (ppm) | 1000 | 1000 | 1000 | 1000 | 1000 | 1000 |
| Reaction temperature (°C.) | 80 | 80 | 80 | 80 | 80 | 80 |
| Chelating agent | TETA | ED | EDTA Na$_4$ | NTA Na$_3$ | Na Oxalate | EDTA |
| Reducing agent | $FeSO_4$ | $FeSO_4$ | $FeSO_4$ | $FeSO_4$ | $FeSO_4$ | $FeSO_4$ |
| Add level (pph) | 85 | 85 | 85 | 85 | 85 | 85 |
| Conversion (%) | 96 | 95 | 84 | 61 | 63 | 50 |
| MFR | 9.5 | 78.11 | 172.1 | 291.3 | >300 | >300 |
| Mw × 1000 | 1050 | 1095 | 1578 | 1247 | 905 | 1009 |
| Mw/Mn | 4.7 | 3.2 | 4.6 | 4.2 | 4.8 | 4.2 |
| GE (%) | 91.3 | 41.2 | 23.8 | 27.6 | 15.9 | 38.2 |

Use of TETA as the chelating agent in combination with $FeSO_4$ as the reducing agent produced the highest values for both % conversion and grafting efficiency.

EXAMPLE 7

This example illustrates how the porosity of the polypropylene that is irradiated and the grafting reaction temperature affect the dispersion of the polystyrene in the polypropylene matrix.

The oxidized polypropylene that was exposed to 20,000 ppm oxygen used in Example 3 (low porosity, $O_2$ concentration 20,000 ppm, grafting temperature 35° C.) differs from the oxidized polypropylene in Example 5 (high porosity, $O_2$ concentration 1000 ppm, grafting temperature 65° C.).

In order to compare the uniformity of dispersion of the polystyrene in the polypropylene matrix, IR spectra of 10–15 micron microtomed sections of spheres were recorded under computer control every 6 microns across the length of the sphere. The polystyrene level calculated at each point was plotted against the corresponding distance in microns from the edge of the sphere (0–200 pph polystyrene). Polystyrene is more uniformly dispersed in graft polymers obtained from porous oxidized polypropylene (Example 5) as shown in FIGS. 1 and 2. In the particles obtained from low porosity oxidized polypropylene (Example 3), in spite of having 20 times more reaction sites, the polystyrene is concentrated at the surface of the sphere and there is very little in the matrix (FIGS. 3 and 4).

EXAMPLE 8

This example describes the preparation of polypropylene grafted with methyl methacrylate (MMA) using various surfactants, $FeSO_4$ as the reducing agent, TETA as the chelating agent, and glucose as the secondary reducing agent.

The propylene homopolymer described in Example 1 was irradiated according to the process described in Example 1. The absorbed radiation dose was 6 Mrad and the polymer was exposed to 1000 ppm $O_2$ (0.1% by volume) after irradiation.

All reactions were carried out as described under "Reaction Temperature of 80° C." in Example 1. The amount of oxidized polymer used was 50 g. The surfactant was added at 50° C.–55° C. (0.53 g, 0.23%). $FeSO_4$ 0.4 g, 1.44 mmol), TETA (0.32 g, 2.2 mmol), and glucose (0.5 g, 2.8 mmol) were added at 70° C. MMA was added at 80° C. after 10–12 minutes, and the reaction mixture was stirred for three hours. The product was recovered as described in Example 1.

The % conversion of MMA monomer to poly(MMA) (both grafted and ungrafted), the MFR of the product, the $M_w$ and $M_w/M_n$ of the ungrafted poly(MMA), and the grafting efficiency are given in Table 7.

TABLE 7

| Oxidized PP, MFR | 2427 | 2427 | 2427 | 2427 |
|---|---|---|---|---|
| Radiation dose (Mrad) | 6 | 6 | 6 | 6 |
| Surfactant | Brij 35 | Brij 78 | Igepal CO890 | Distearyl-dimethylammonium chloride |
| $O_2$ concentration (ppm) | 1000 | 1000 | 1000 | 1000 |
| Reaction temperature (°C.) | 80 | 80 | 80 | 80 |
| Add level (pph) | 85 | 85 | 85 | 85 |
| Conversion (%) | 89 | 87.5 | 87 | 88 |
| MFR | 67.9 | 67.9 | 87.4 | |
| Mw × 1000 | 1580 | 1350 | 1200 | 2200 |
| Mw/Mn | 6.3 | 4.3 | 3.9 | 11.9 |
| GE (%) | 74.9 | 42.1 | 44.3 | 53.3 |

Use of Brij 35 nonionic surfactant provided the highest values for % conversion and grafting efficiency.

EXAMPLE 9

This example describes the preparation of polypropylene grafted with styrene and methyl methacrylate monomers.

The propylene homopolymer described in Example 10 was irradiated as described in Example 1 using an absorbed radiation dose of 0.5 Mrad, and the irradiated polymer was exposed to an oxygen concentration of 2000 ppm (0.2% by volume) after irradiation.

The grafting reaction was carried out as described in Example 1 using 50 g oxidized polypropylene (3.12 mmol $O_2$) and 0.57 g sodium myristate (0.25%) as the surfactant at 35° C. $FeSO_4$ (0.8 g, 2.8 mmol), TETA (0.64 g, 4.4 mmol) and glucose (1.0 g, 5.5 mmol) were added at 3 5° C. After ten minutes, styrene and MMA (1:1, 21.5 g each, 85 pph total) were added. After stirring for six hours at 35° C., the reaction mixture was left at room temperature overnight. The polymer was recovered as described in Example 1. The % conversion of monomers to styrene/MMA copolymer (both grafted and ungrafted) was 80% (84.1 g) and the grafting efficiency was 36%.

EXAMPLE 10

This example illustrates the preparation of polypropylene grafted with styrene according to the process of this invention.

A propylene homopolymer was irradiated by the process described in Example 1 at a radiation dose of 0.5 Mrad. The irradiated polymer was exposed to 0.2% by volume oxygen in the first and second treatment steps. The propylene homopolymer had a melt flow rate (MFR) of 9 dg/min, a surface area of 0.3 $m^2/g$, a pore volume fraction of 0.28 wherein more than 90% of the pores had a diameter larger than 1 micron, a weight average diameter of 1.9 mm, a porosity of 0.45 cc/g, and a $M_w$ of 170,000, and is available from Montell USA Inc.

An agitated suspension of the oxidized polypropylene (225 g, 14.06 mmol $O_2$) in deionized water (883 ml) in a 2 liter glass reactor was purged with nitrogen and the suspension was slowly heated to 50° C. At 40° C., a suspension of sodium myristate (3.1 g, 0.15%) in deionized water (50 ml) was added to the suspension. At 50° C., solutions of $FeSO_4$ (1.9 g, 6.5 mmol), TETA (1.52 g. 10.4 mmol) and glucose (2.7 g, 15 mmol) in 50 ml deionized water each were added. After 10 minutes styrene (191.25 g, 85 pph) (water/monomer =5.5) was added slowly to the reactor and the reaction mixture was stirred for five hours. The reaction mixture was cooled to room temperature and the suspended polymer was recovered as described in Example 1. The weight of the final product was 397.2 g. The conversion of styrene to polystyrene (both grafted and ungrafted) was 90%.

COMPARATIVE EXAMPLE 11

This comparative example illustrates the preparation of polypropylene grafted with styrene by the method described in Example 10, except that a reducing agent was not used. The example demonstrates that the grafting reaction of Example 10 took place by a redox initiated polymerization mechanism rather than by thermal decomposition.

An agitated suspension of oxidized polypropylene prepared as described in Example 10 (225 g, 14.06 mmol) in deionized water (1001 ml) in a two liter glass reactor was purged with nitrogen and the suspension was slowly heated to 50° C. At 40° C., a suspension of sodium myristate (3.1 g, 0. 15%) in deionized water (50 ml) was added to the suspension. At 50° C., styrene (191.25 g, 85 pph) (water/monomer =5.5) was added slowly to the reactor and the reaction mixture was stirred for five hours. The reaction mixture was cooled and the suspended polymer was filtered, washed, and dried as described in Example 1. The weight of the final product was 242.2 g. Only 9% of the styrene was converted to polymer.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for making a graft copolymer of a propylene polymer material, the process comprising the following steps in sequence:

(1) making an oxidized propylene polymer material by (a) irradiating a particulate polypropylene material having (i) a pore volume fraction of at least about 0.07 wherein more than 40% of the pores have a diameter larger than 1 micron, (ii) a surface area of at least 0.1 $m^2/g$, and (iii) a weight average diameter of about 0.4 to about 7 mm, in an environment in which the concentration of active oxygen is equal to or less than 0.004% by volume, (b) adding a controlled amount of oxygen to the irradiated propylene polymer material so that the irradiated propylene polymer material is exposed to an amount of oxygen of greater than 0.004% and less than 15% by volume at a temperature of about 40° C. to about 110° C., and (c) heating the irradiated polymer to a temperature of at least 110° C. in the presence of a controlled amount of oxygen within the same range as is used in (b), (2) dispersing the resulting oxidized propylene polymer material in water in the presence of a surfactant at a temperature of about 30° C. to about 90° C., (3) adding (a) a primary reducing agent, (b) a chelating agent, and (c) a secondary reducing agent, (4) adding at least one vinyl monomer, and (5) recovering the graft copolymer from the reaction mixture.

2. The process of claim 1, wherein the propylene polymer material is selected from the group consisting of (a) a homopolymer of propylene, (b) a random copolymer of propylene with ethylene or a linear or branched 4–10 carbon alpha-olefin, provided that when the comonomer is ethylene the maximum polymerized ethylene content is 10%, and when the comonomer is a 4–10 carbon alpha-olefin, the maximum polymerized content thereof is 20%, or (c) a terpolymer of propylene and two different alpha-olefins selected from the group consisting of ethylene and 4–8 carbon alpha-olefins, provided that when ethylene is one of the different alpha-olefins, the maximum polymerized ethylene content is 5%, and when the different alpha-olefin is a 4–8 carbon alpha-olefin, the maximum polymerized content of the 4–8 carbon alpha-olefin is 20%.

3. The process of claim 2, wherein the propylene polymer material is a propylene homopolymer.

4. The process of claim 1, wherein the temperature in step (2) is about 65° C. to about 80° C.

5. The process of claim 1, wherein the reducing agent is an inorganic acid salt of a transition metal selected from the group consisting of the metals of GroupIB, IIIB, IVB, VB, VIB, VIIB and VIIIB of the Periodic Table.

6. The process of claim 5, wherein the reducing agent is ferrous sulfate.

7. The process of claim 1, wherein the chelating agent is selected from the group consisting of ethylenediaminetetraacetic acid, hydroxyethylethylenediaminetriacetic acid, nitrilotriacetic acid, citric acid, tartaric acid, gluconic acid, 5-sulfosalicylic acid, ethylenediamine, diethylenetriamine, triethylenetetramine, triaminotriethylamine, triethanolamine, N-hydroxyethylethylenediarine, and sodium oxalate.

8. The process of claim 7, wherein the chelating agent is trieethylenetetramine.

9. The process of claim 1, wherein the the vinyl monomer is a compound in which the vinyl radical $CH_2=CR-$, in which R is H or a methyl group, is attached to a straight or branched aliphatic chain or to a substituted or unsubstituted aromatic, heterocyclic, or alicyclic ring in a mono-or polycyclic compound.

10. The process of claim 9, wherein the vinyl monomer is selected from the group consisting of styrene, vinylnaphthalene, vinylpyridine, vinylpyrrolidone, vinylcarbazole, methylstyrenes, methylchlorostyrene, p-tert-butylstyrene, methylvinylpyridine, ethylvinylpyridine, acrylonitrile, methacrylonitrile, acrylic acid esters, methacrylic acid esters, and mixtures thereof.

11. The process of claim 10, wherein the vinyl monomer is selected from the group consisting of styrene, acrylonitrile, butyl acrylate, 2-ethylhexyl acrylate, methyl methacrylate, methyl acrylate, butyl methacrylate, and mixtures thereof.

12. The process of claim 11, wherein the vinyl monomer is selected from the group consisting of styrene, methyl methacrylate, and mixtures thereof.

13. The process of claim 1, wherein the primary reducing agent is ferrous sulfate and the chelating agent is triethylenetetramine.

* * * * *